United States Patent [19]

Hawthorne

[11] Patent Number: 5,323,338
[45] Date of Patent: Jun. 21, 1994

[54] PSEUDO-RANDOM SEQUENCE GENERATORS

[75] Inventor: William M. Hawthorne, Norwich, England

[73] Assignee: Enfranchise Sixty Limited, Cambridge, England

[21] Appl. No.: 923,892

[22] PCT Filed: Feb. 22, 1991

[86] PCT No.: PCT/GB91/00283

§ 371 Date: Aug. 24, 1992

§ 102(e) Date: Aug. 24, 1992

[87] PCT Pub. No.: WO91/13400

PCT Pub. Date: Sep. 5, 1991

[30] Foreign Application Priority Data

Feb. 22, 1990 [GB] United Kingdom ............... 9003999

[51] Int. Cl.$^5$ .................................................. G06F 7/58
[52] U.S. Cl. .................................................. 364/717
[58] Field of Search ...................................... 364/717

[56] References Cited

U.S. PATENT DOCUMENTS

| | | | |
|---|---|---|---|
| 3,963,905 | 6/1976 | Gopinath et al. | 364/717 |
| 4,058,673 | 11/1977 | Johansson | 364/717 |
| 4,142,240 | 2/1979 | Ward et al. | 364/717 |
| 4,780,840 | 10/1988 | Van Den Ende | 364/717 |
| 4,852,023 | 7/1989 | Lee et al. | 364/717 |
| 5,057,795 | 10/1991 | Napier | 364/717 |
| 5,153,532 | 10/1992 | Albers | 364/717 |

FOREIGN PATENT DOCUMENTS 0097997 1/1984 European Pat. Off. ........ H04L 9/04
5736344 2/1982 Japan .............................. G06F 7/58

OTHER PUBLICATIONS

L'Ecuyer, Pierre, "Efficient and Portable 32-Bit Random Variate Generators," Proceedings of the 1986 Winter Simulation Conference, Dec. 10, 1986, pp. 275–277.

Westlake, W. J., "A Uniform Random Number Generator Based on the Combination of Two Congruential Generators," Journal of the Association for Computing Machinery, Apr. 1967, vol. 14, No. 2, pp. 337–340.

Primary Examiner—David M. Malzahn
Attorney, Agent, or Firm—Synnestvedt & Lechner

[57] ABSTRACT

A pseudo-random sequence generator characterized by comprising a plurality of substantially similar elements adapted to operate in parallel, each said element including: means for entering at least first and second different numbers into that element, and means for processing said numbers including multiplier means for creating intermediate numbers of higher value than either of said first and second numbers and modulating means for subsequently reducing those intermediate numbers to values below the higher of said first and second numbers, whereby said processing means is adapted to generate a first sequence that has a period of not less than half the number range of said first sequence; and means for combining the first sequences, number by number, from all the parallel elements to permit generation of a pseudo-random sequence of higher period.

10 Claims, 5 Drawing Sheets

PSEUDO-RANDOM SEQUENCE GENERATORS

FIELD OF THE INVENTION

This invention relates to pseudo-random sequence generators.

BACKGROUND TO THE INVENTION

Pseudo-random sequences of integers find many applications, for example in the sampling and simulation technologies. Sampling is an important factor for example in the pharmaceutical, biotechnological, medical and social sciences, and simulation of random events is used in many methods of destruction testing and prototype development in mechanical and civil engineering. Pseudo-random sequence generators also find applications in electronics, computer and communication technologies.

A random sequence is one in which, for all integral values of n, however large, the (n+1)th term in the sequence cannot be determined from knowledge of all the previous terms from the first to the (n)th. For example, data collected from 1,000,000 throws of a conventional six-faced die is of no assistance in determining the result of the 1,000,001th throw.

A pseudo-random sequence is a sequence for which it is perceived to be impossible to determine the (n+1)th term solely from knowledge of all the n previous terms unless n exceeds a very large number. In the state of the art, such a number is of the order of $1 \times 10^{190}$ and there are statistical techniques available, such as the Berlekamp-Massey and the Sloane-Reeds tests which permit a formal judgement of the perception of impossibility. In this context the period of a sequence is the value of C such that, for all values of n, the (n+C) the term is identical to the (n)th term.

An object of the present invention is to make it possible to provide a pseudo-random generator wherein the period can be arranged to be very high while still retaining practical levels of speed and cost.

SUMMARY OF THE INVENTION

According to the present invention there is provided a pseudo-random sequence generator characterised by comprising a plurality of substantially similar elements adapted to operate in parallel, each said element including:

means for entering at least first and second different numbers into that element, and means for processing said numbers including multiplier means for creating intermediate numbers of higher value than either of said first and second numbers and modulating means having a modulating number for subsequently reducing those intermediate numbers to values below the modulating number, whereby said processing means is adapted to generate a first sequence that has a period not less than half the number range of said first sequence; and means for combining the first sequence number by number from all the parallel elements to permit generation of a pseudo-random sequence of higher period.

In preferred embodiments of the present invention the use of the combination of multiplying and pipelined modulating algorithms permits each parallel element to generate a pseudo-random sequence with a significantly high period, e.g. of the order of 30,000 in one embodiment when the modulus used for modulating is a prime number of the order of 60,000. This is a convenient level for 16 bit computer operation because $2^{16}-1=65,535$. The use of a number V of such similar elements operating in parallel permits the combined output pseudo-random sequence to have a period of the order of 30,000 to the power V. Thus the relationship between period and number of parallel elements is as follows:

| V | approximate period |
|---|---|
| 5 | $30,000^5 = 2.4 \times 10^{22}$ |
| 6 | $30,000^6 = 7.3 \times 10^{26}$ |
| 7 | $30,000^7 = 2.2 \times 10^{31}$ |
| 20 | $30,000^{20} = 3.5 \times 10^{89}$ |
| 43 | $30,000^{43} = 3.3 \times 10^{192}$ |

The highest period currently required in the technological use of randomness is $5 \times 10^{189}$, and thus 43 parallel elements can fulfil this requirement.

Advantageously there is provided a pseudo-random sequence generator of the type described above characterised by each said element including:

means for entering a third different number into that element, the means modulating by the third number any number supplied thereto to provide a remainder number, the multiplier means comprising: first means for multiplying the first number successively by powers of the second number, subjecting each product of this multiplication to said modulation, and storing the results of those successive modulations, and second means for multiplying each said stored result in succession by a predetermined number and subjecting each product of this multiplication to said modulation to create a sequence of numbers at an output of that element; and the means for combining comprising means for sequentially combining together a different number from the sequence at each said parallel element output to provide a pseudo-random sequence of numbers.

The multiplier means preferably includes third means for multiplying the second number successively by that remainder number created as a result of said modulation of the immediately previous result of such multiplication, and means for storing the final result of those successive multiplications, said final result serving as said predetermined number utilised by said second multiplying means.

Said second means preferably includes means for feeding back each number in said sequences of numbers as it is created to replace a said stored result in said storing means, whereby said second means is provided at its input with an endless supply of numbers for multiplication by said predetermined number and subsequent modulation so that said second means can create an endless said sequence of numbers.

Said modulating means is preferably a pipelined modulator wherein the most significant bit is eliminated in successive stages in the pipeline to leave a said remainder of lower value than said modulating number.

Said combining means is suitably a hierarchy of adding means wherein the (n)th number in the sequences from the parallel element outputs are first added in pairs, then the results are added in pairs until a single number is produced to serve as a basis for the (n)th number in said pseudo-random sequence.

Each said parallel element preferably includes entering means for entering first, second and third different numbers, and preferably the first, second and third numbers of each one of said elements are different from the first, second and third numbers of all the other said elements.

More preferably the third numbers in each element are relatively prime with respect to each number. A series of numbers are 'relatively prime' if there is no number, apart from 1, that is a common factor to all of the numbers in the series; e.g. 5,9 and 45. This improves the period of the generated sequence.

An embodiment of the invention will now be described, by way of example, with reference to the accompanying drawings; in which:

DESCRIPTION OF THE PREFERRED EMBODIMENT

Figure 1:
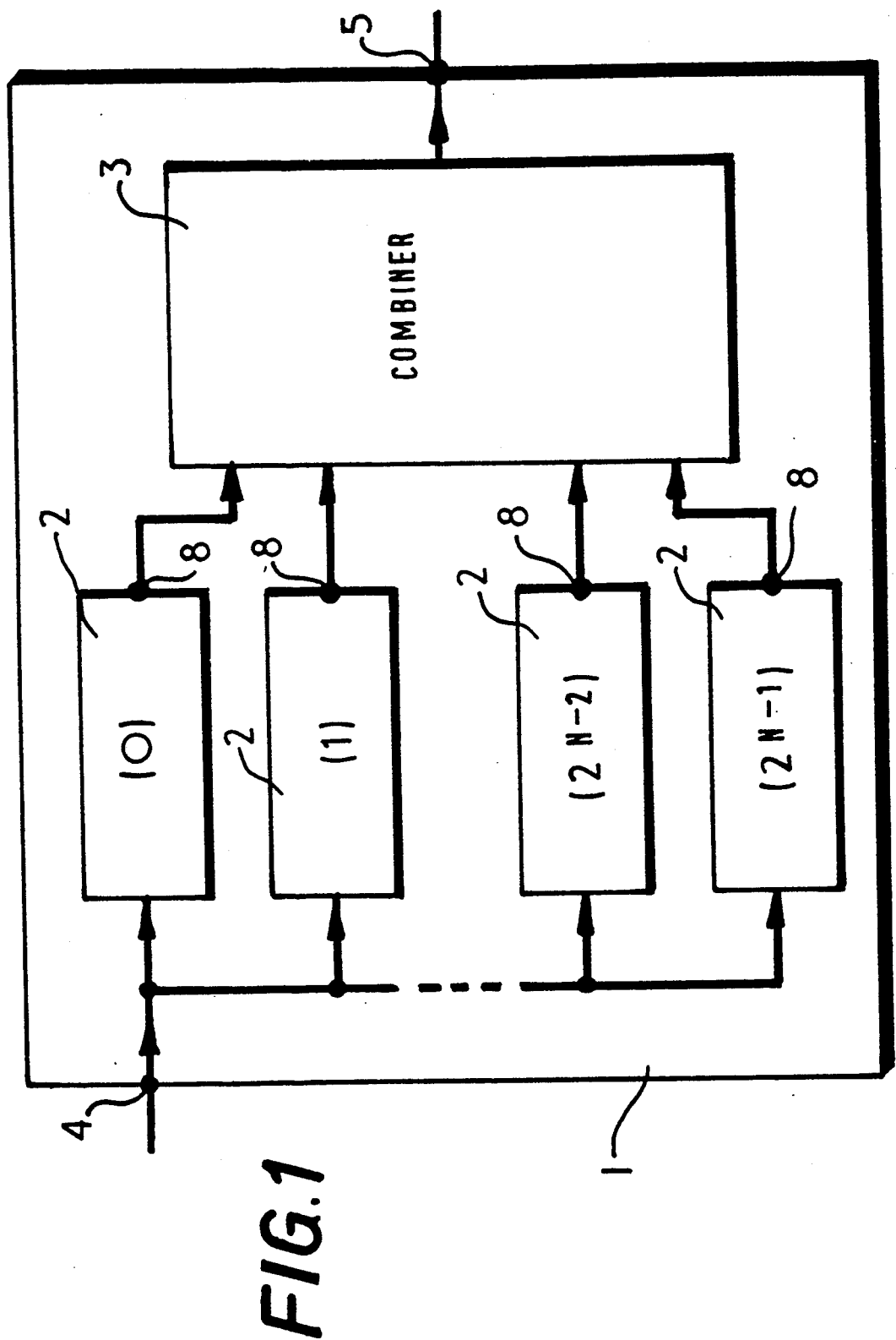
FIG. 1 is a schematic block diagram of a pseudo-random sequence generator according to the invention.

FIG. 1 shows a pseudo-random generator identified as device 1 comprising a plurality V of elements 2 (2(0), 2(1) up to 2 ($2^{N-1}$)) connected and controlled to operate in parallel and with outputs 8 connected to a combinatorial system 3. A common control and data input 4 is connected to the inputs of all the elements 2 and a device output 5 supplies a pseudo-random sequence from the output of system 3.

Figure 2:
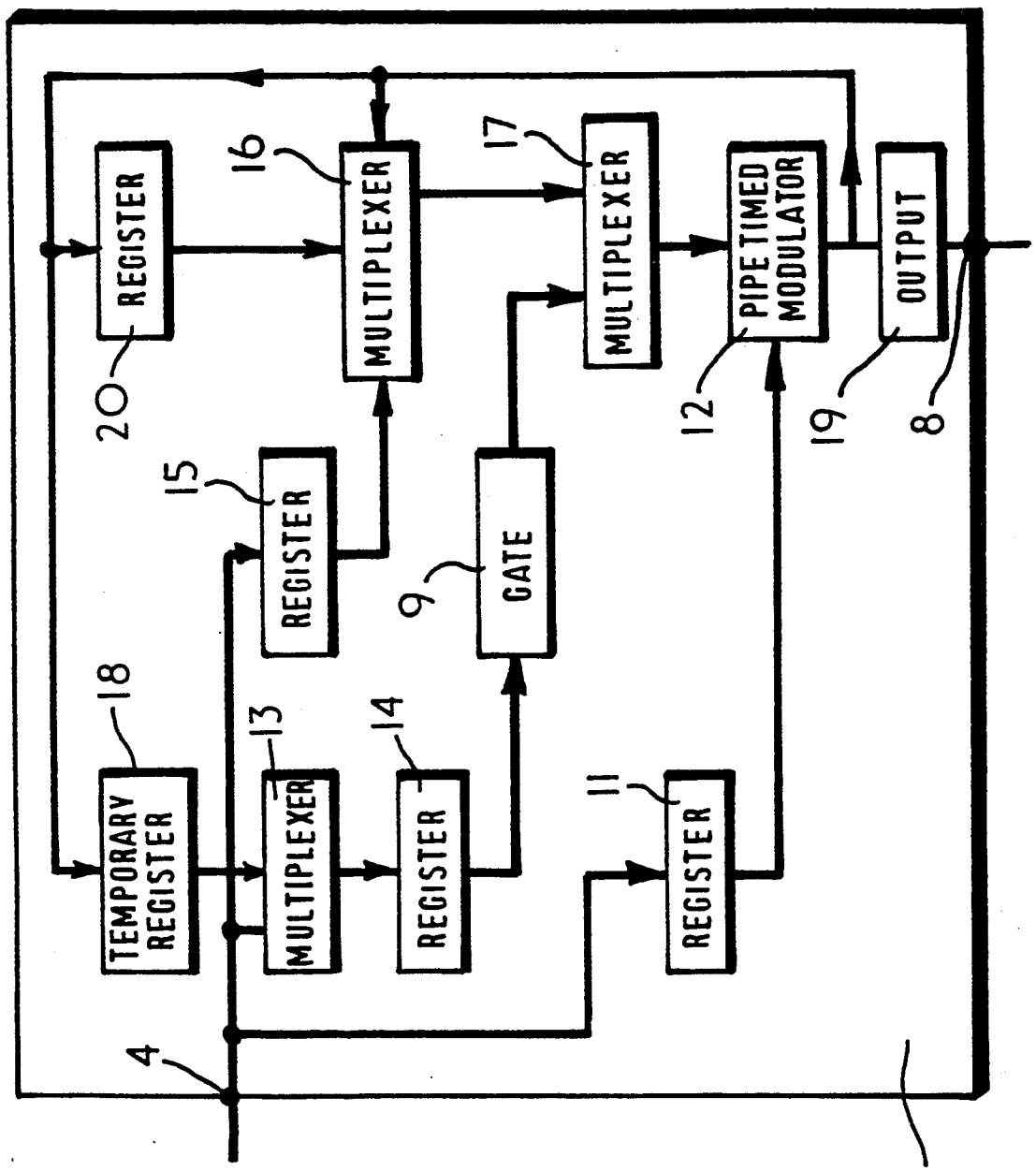
FIG. 2 is a schematic block diagram of a parallel element in the generator.

FIG. 2 shows one of the V parallel elements 2, which are preferably identical to one another. An input terminal is connected through a register 11 to a pipelined modulator 12, in parallel through a multiplexer 13, register 14, gate 9 and multiplier 17 to the pipelined modulator 12, and in parallel through a register 15, multiplexer 16 and the multiplier 17 to the pipelined modulator 12. The pipelined modulator 12 has four output paths, a first feedback path to the input of multiplexer 16, a second feedback path through a register 20 to the multiplexer 16, a third path to a temporary register 18 having an output connected to the multiplexer 13, and a fourth output path through an output register 19 to one of the V inputs of the combinatorial system 3.

Figure 3:
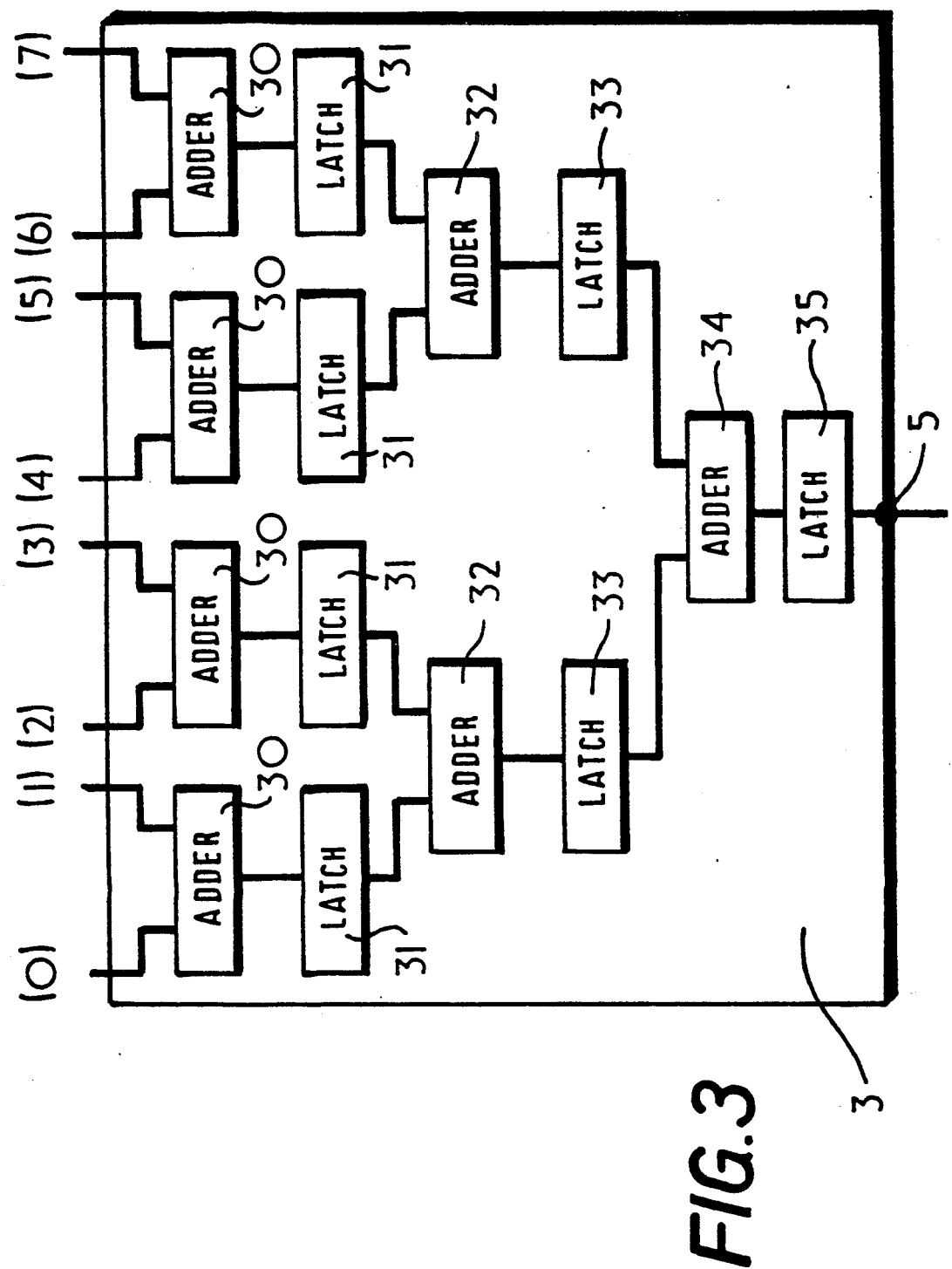
FIG. 3 is a schematic block diagram of a combinatorial system in the generator.

FIG. 3 shows a combinatorial system for an embodiment where the number of parallel elements V is eight. The eight parallel inputs, identified as from parallel elements numbered (0) to (7), are connected to a hierarchy of latched adders. The eight inputs are connected in pairs to four adders 30 whose outputs are connected through four latches 31 in pairs to two adders 32 whose outputs are connected through two latches 33 to a single adder 34 whose output is connected through a latch 35 to the device output 5.

Figure 4:
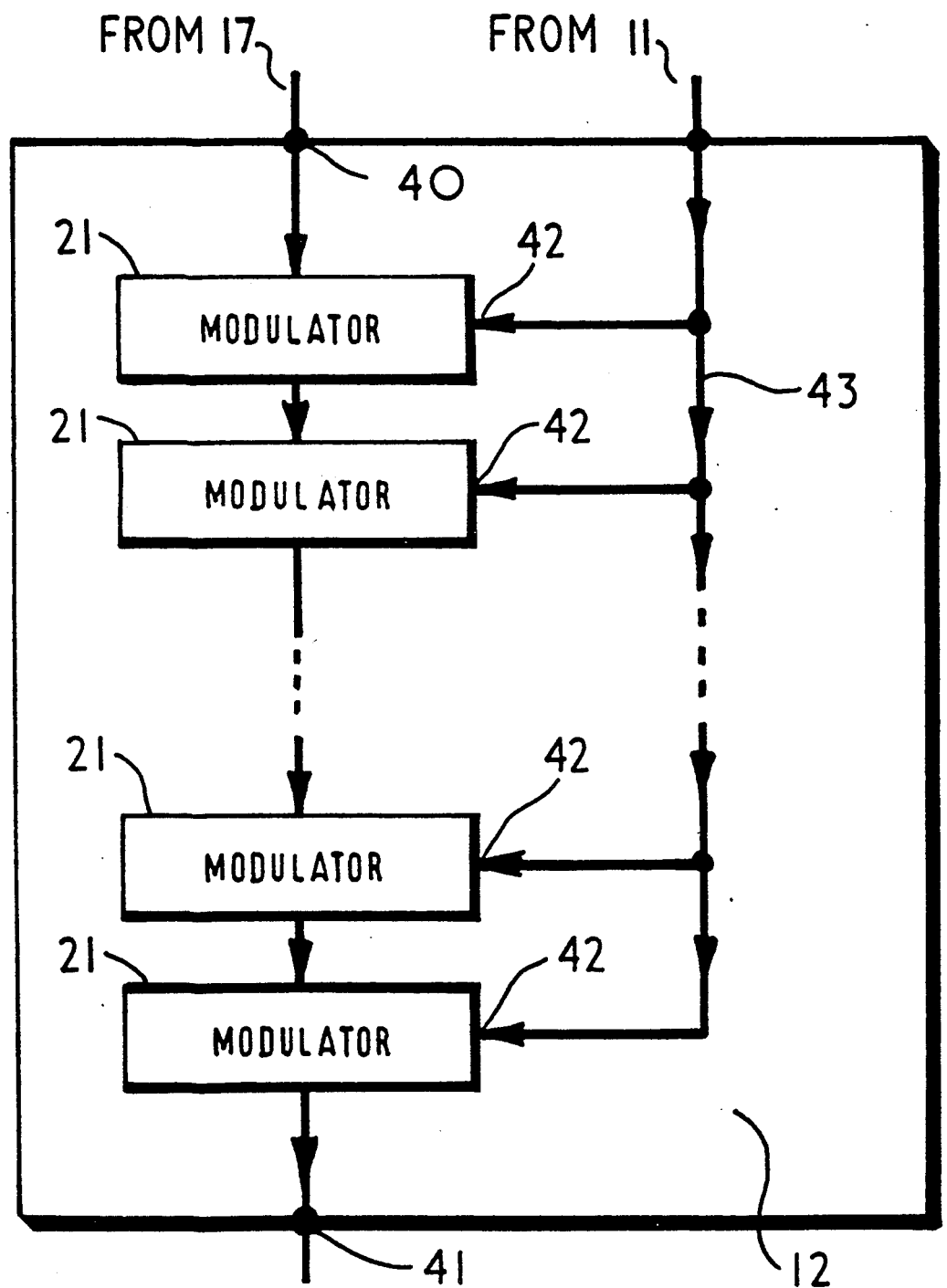
FIG. 4 is a schematic block diagram of a pipelined modulator in each parallel element.

FIG. 4 shows one of the pipelined modulators 12. An input 40 is connected from the multiplier 17 to feed a pipeline of W modulator elements 21, and an output 41 is taken from the end element 21 of the pipeline to the four described output paths from the pipeline. Each modulator element has a second input 42 from a common line 43 connected to the output of the register 11.

Figure 5:
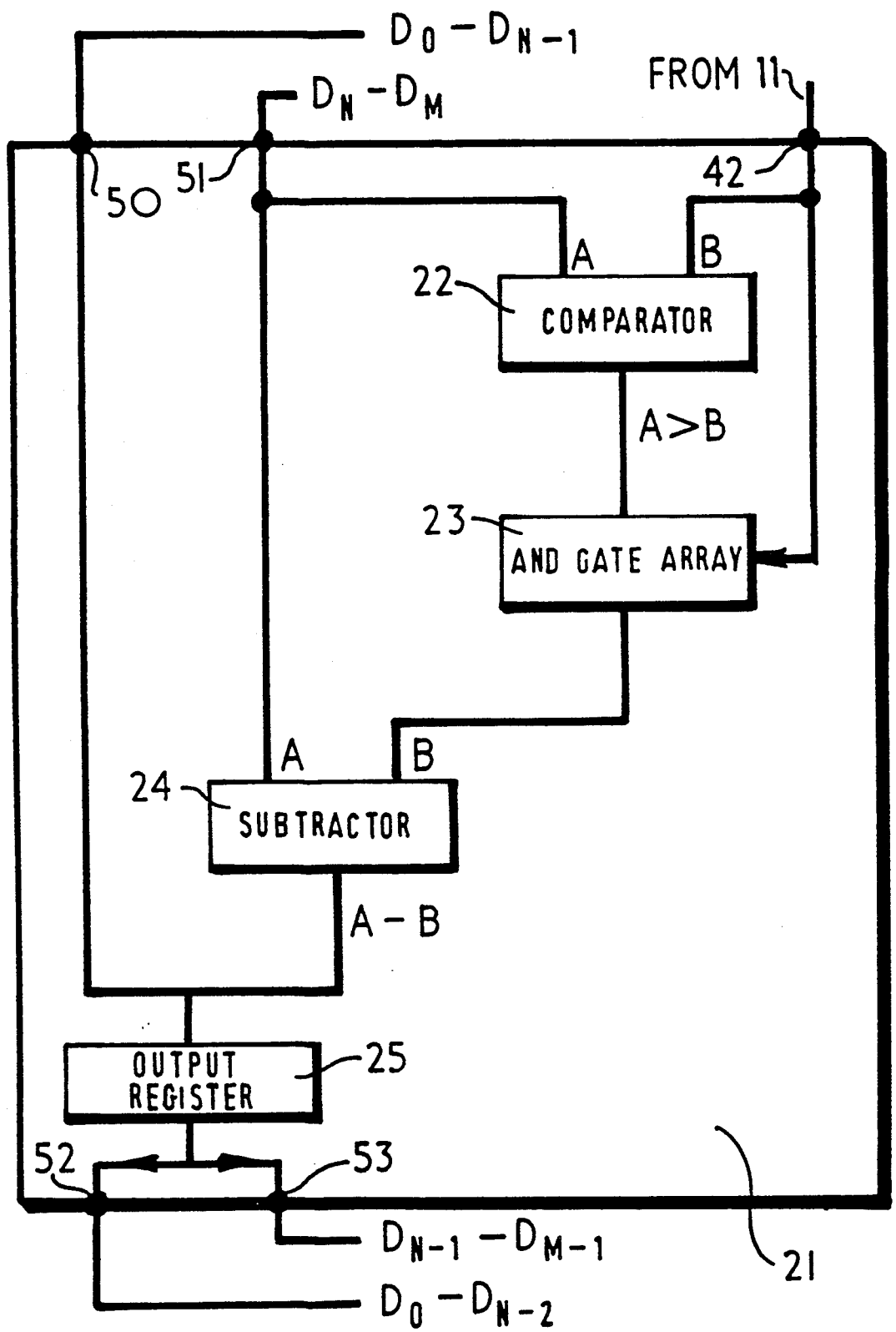
FIG. 5 is a schematic block diagram of a modulator element in each pipelined modulator.

FIG. 5 shows one of the W identical modulator elements 21 in each pipeline modulator 12. Each has two parallel inputs 50, 51 and two parallel outputs 52, 53 for supplying respectively least and most significant parts of a data word along the pipeline as will be explained. An output register 25 is connected between the inputs and the outputs. A comparator 22 has inputs A and B from the element input 51 and the input 42 respectively, and an output connected to the first input of an AND gate array 23. The input 42 is connected to a second input of the AND gate array 23 and its output is connected to a first input B of a subtractor 24. The input 51 is connected to a second input A of the subtractor 24. The output of the subtractor is connected to the output register 25.

In operation of the generator, the V parallel elements are first primed, conveniently substantially simultaneously, by entering selected numbers at input 4 and processing the numbers with elements 2 in a priming mode as will be described. When all the elements 2 are primed, they are operated in a run mode in parallel to supply number sequences at their outputs 8 that have periods not less than half the number range of the sequences. The outputs are combined in parallel in any suitable manner, for example by system 3 shown in FIG. 3, to permit generation of a pseudo-random sequence of higher period.

Each parallel element 2 is primed by the following priming sequence described in relation to FIG. 2.

1. A modulating number X is entered at terminal 4 and stored in the register 11. This number X is used by the pipelined modulator 12 as an operator on any number passing along the pipeline and, as shown in FIG. 4, the register 11 is connected to the second input 42 of each modulator element 21 along the pipeline. The modulating number is preferably a prime number in the region of 60,000.

2. A multiplying number Y is entered at terminal 4 and stored both in the register 14, via the multiplexer 13, and in the register 15. The multiplying number can be any number greater than one and less than the modulating number.

3. The multiplying number Y in the register 15 is passed through the multiplexer 16 to the multiplier 17 which operates to multiply Y with the same number Y from the register 14, i.e. Y is squared.

4. The result of this multiplication, $Y^2$, is passed through the pipelined modulator 12 and, in this priming mode, the output from terminal 41 is supplied only along the first feedback path to the input of multiplexer 16 and not to registers 18, 19 or 20. At this stage $Y^2$ is usually less than X and accordingly the output of the pipeline is $Y^2$ rather than the remainder of $Y^2 \div X$.

5. The multiplying number Y in the register 15 is again passed through the multiplexer 16 to the multiplier 17 which operates to multiply Y with the result, at this stage $Y^2$, of the first pass through the pipeline as fed back in step 4. This step 5 is repeated the same number of times in total as the number W of the modulator elements 21 along the pipeline.

6. The result of the W repetitions of step 5 is a number which is stored in the temporary register 18. This number will be $Y^W$ if that is less than X or a lesser number if $Y^W$ exceeds the modulating number X. None of the intermediate results are stored.

7. Register 15 is cleared and a running number Z is entered at terminal 4 and stored in the register 15 in place of the number Y. The running number Z is preferably different from Y and can also be any number greater than one and less than the modulating number.

8. The running number Z in the register 15 is passed through the multiplexer 16 to the multiplier 17 which operates in this step simply to pass the number Z unchanged to the pipelined modulator 12. In this step the gate 9 is put in a state such that the number supplied to the multiplier 17 is equal to the number one.

9. The output from terminal 41 of the pipelined modulator 21 is supplied only along the second feedback path to the register 20 which stores the result of the modulation, i.e. Z, because Z is less than the modulating number X.

10. The running number Z in the register 15 is again passed through the multiplexer 16 to the multiplier 17 which now operates to multiply Z with the number Y from the register 14.

11. The result of this multiplication, (Y×Z), is again passed through the pipelined modulator 12. The output from terminal 41 is again supplied to the register 20 and is also supplied to the multiplier 17 via the multiplexer 16 at which time the gate 9 is held in a state such that its output is the number one, rather than the number Y stored in register 14, thus allowing the number (Y×Z) to pass unchanged through the multiplier 17 and be stored within the registers 25 in the pipelined modulator 12. Steps 10 and 11 are repeated W times with all the previously generated values of $(Y^n \times Z)$ modulo X being passed unchanged to the modulator 12 and being stored therein, the resulting W numbers each being temporarily stored in sequence in the register 20.

12. The registers 25 in the successive modulator elements 21 from the bottom of the modulator 12 upwards now hold the sequence of W numbers $(Y^n \times Z)$ modulo X in the order of their generation.

13. The number stored in the temporary register 18 in step 6 is transferred via the multiplexer 13 into the register 14. The parallel element 2 is now primed in readiness for the run mode.

When all the parallel elements are primed, they operate in parallel in mutual synchronism in the run mode under the control of a master clock in a manner known to those skilled in the art.

In the run mode, the sequence of W numbers stored in the registers 25 of the W modulator elements 21 are indexed downwards in the pipeline step by step and subjected at each step to a respective step of modulation as shown in FIG. 5 and described below. As each remainder number leaves the bottom of the pipeline at the output 41 it is supplied, in this run mode, both along the first feedback path to the input of multiplexer 16 and also along the fourth output path through an output register 19 to one of the V inputs of the combinatorial system 3. The remainder number is passed through the multiplexer 16 to the multiplier 17 which operates to multiply the remainder number with the number stored in the register 14 from step 13 of the priming mode.

The output register 19 is thus supplied with an endless sequence of numbers, one for each downward indexing step of the pipelined modulator 12. This endless sequence is supplied to the combinatorial system 3 in synchronism with the endless sequence from all the other parallel elements 2. The system shown in FIG. 3 adds the numbers in the illustrated adder hierarchy to produce a pseudo-random sequence at the device output 5 as described above.

The operation of each modulator element 21 in the pipelined modulator 12 will now be described in relation to FIG. 5, which shows an intermediate stage modulator element.

The digital input from the previous stage has its bits split into two portions, the more significant portion $D_N$ to $D_M$ having the same number of bits as the modulating number X. This portion is compared with the modulating number X in the comparator 22. If it is larger than X then the comparator gives a first or true indication to the AND gate array 23, and if it is smaller than X then the comparator gives a second or false indication to the array 23.

The array 23 effectively multiplies the modulating number X either by one or by zero. The outputs of the array 23 are fed to input B of the subtractor 24 which operates to subtract B from A, i.e. the output of the subtractor 24 is equal to the more significant portion of the input less the modulating number X provided that the input is greater than X. The result of the subtraction is combined in the output register 25 with the unchanged less significant portion of the input and the number to be passed to the next stage modulating element 21 is re-portioned so that the more significant portion is now $D_{N-1}$ to $D_{M-1}$. The number of stages W in the pipelined modulator 12 is always sufficient to reduce any possible output from the multiplier 17 to a value less than the value of the modulating number X, i.e. to complete the modulation down to a proper remainder.

I claim:

1. A pseudo-random sequence generator characterized by comprising a plurality of substantially similar elements connected in parallel with each other and means for entering at least first and second different numbers into each of said elements, each said element including:

means for processing said numbers including multiplier means for creating intermediate numbers of higher value than either of said first and second numbers and modulating means for subsequently reducing those intermediate numbers to values below the higher of said first and second numbers, said processing means generating a first sequence that has a period not less than half the number range of said first sequence; and means for combining said first sequences, number by number, from all said parallel elements to generate a pseudo-random sequence of higher period.

2. A pseudo-random sequence generator according the claim 1 characterized in that said sequence generator includes:

means for entering a third different number into each said element, said modulating means being responsive to said third number to modulate any number supplied thereto to provide a remainder number, said multiplier means comprising: first means for multiplying said first number successively by powers of said second number, means for subjecting each product of this multiplication to said modulation, and means for storing the results of these successive modulations, and second means for multiplying each said stored result in succession by a predetermined number and for subjecting each product of this multiplication to said modulation to create a sequence of numbers at an output of that element; and said means for combining comprising means for sequentially combining together a different number from the sequence at the output of each of said parallel element to provide a pseudo-random sequence of numbers.

3. A pseudo-random sequence generator according to claim 2, characterised in that the multiplier means includes third means for multiplying the second number successively by that remainder number created as a result of said modulation of the immediately previous result of such multiplication, and means for storing the final result of those successive multiplications, said final result serving as said predetermined number utilised by said second multiplying means.

4. A pseudo-random sequence generator according to claim 3, in which:

said modulating means is a pipelined modulator constructed so that the most significant bit of each number is eliminated in successive stages in the pipeline to leave a said remainder of lower value than said modulating number;

said combining means is a hierarchy of adding means constructed so that the (n)th number in the sequences from the parallel element outputs are first added in pairs, then the results are added in pairs until a single number is produced to serve as a basis for the (n)th number in said pseudo-random sequence; and said first, second and third numbers of each one of said parallel elements are different from the first, second and third numbers of all the other said elements.

5. A pseudo-random sequence generator according to claim 4, in which the third numbers in each element are relatively prime with respect to each other.

6. A pseudo-random sequence generator according to claim 2 or claim 3, characterised in that said second means includes means for feeding back each number in said sequence of numbers as it is created, to replace a said stored result in said storing means, whereby said second means is provided at its input with an endless supply of numbers for multiplication by said predetermined number and subsequent modulation so that said second means can create an endless said sequence of numbers.

7. A pseudo-random sequence generator according to claim 2, characterized in that said modulating means is a pipelined modulator constructed so that the most significant bit of each number is eliminated in successive stages in the pipeline to leave a said remainder of lower value than said modulating number.

8. A pseudo-random sequence generator according to claim 2, characterized in that said combining means is a hierarchy of adding means constructed so that the (n)th number in the sequences from the parallel element outputs are first added in pairs, then the results are added in pairs until a single number is produced to serve as a basis for the n(th) number in said pseudo-random sequence.

9. A pseudo-random sequence generator according to claim 2, characterized in that said first, second and third numbers of each one of said parallel elements are different from the first, second and third numbers of all the other said elements.

10. A pseudo-random sequence generator according to claim 2, characterized in that the third numbers in each element are relatively prime with respect to each other.

* * * * *